E. W. BURGESS.
SHOCK HOIST.
APPLICATION FILED NOV. 22, 1916.
1,314,569.
Patented Sept. 2, 1919.
3 SHEETS—SHEET 1.
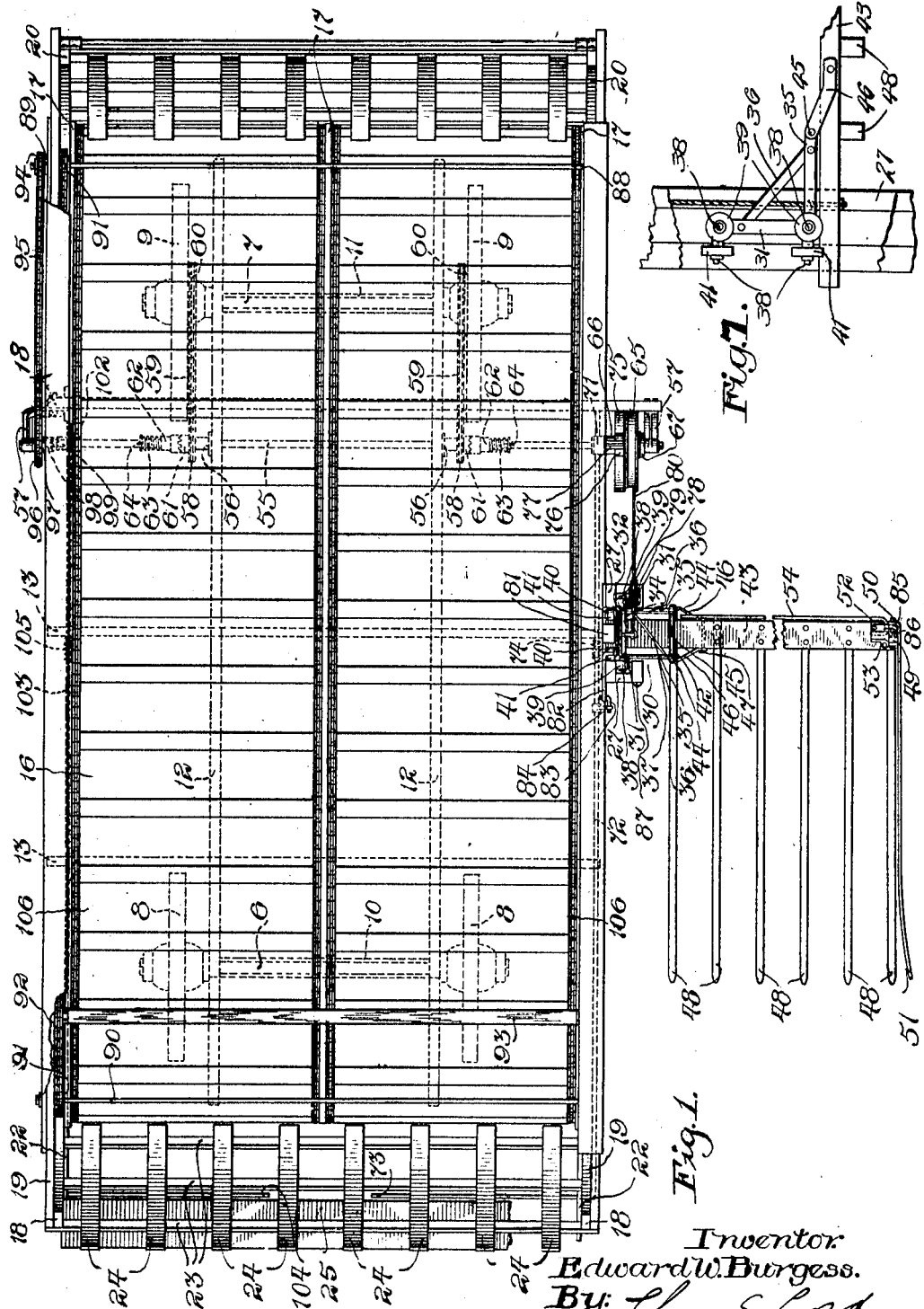
Inventor
Edward W. Burgess.
By: Chas. E. Lord
Atty.

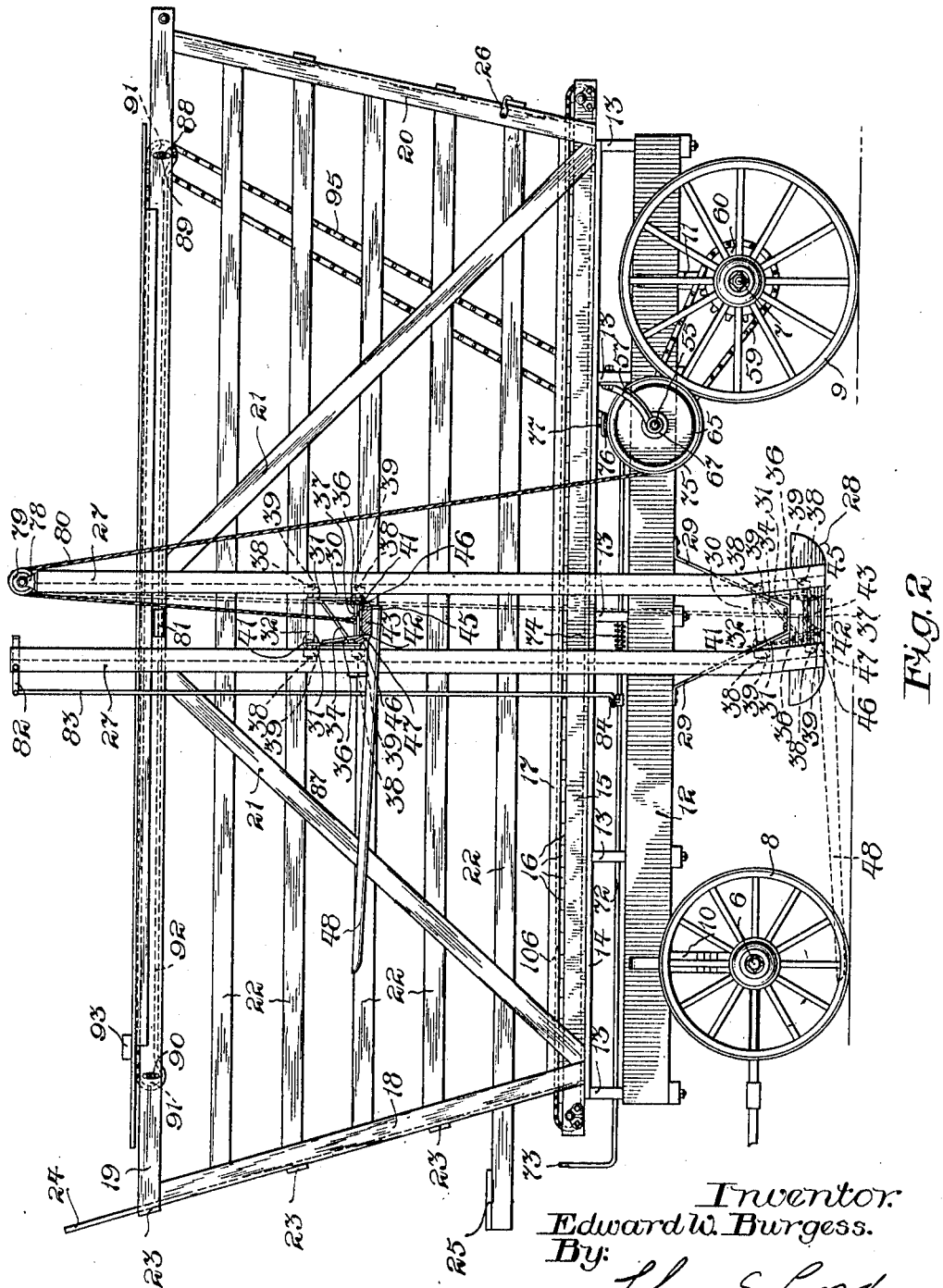

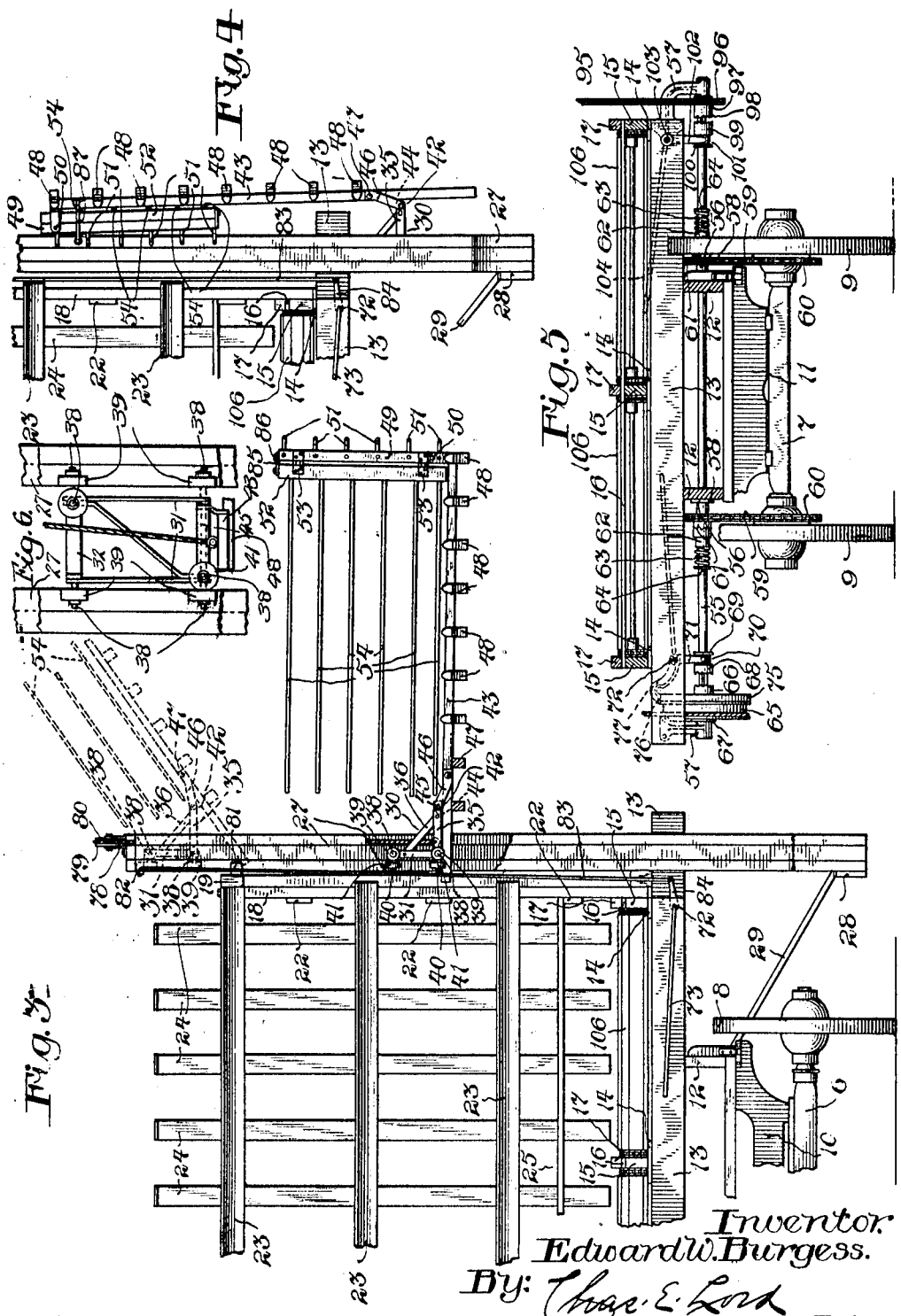

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

SHOCK-HOIST.

1,314,569.  Specification of Letters Patent.  Patented Sept. 2, 1919.

Application filed November 22, 1916. Serial No. 132,812.

*To all whom it may concern:*

Be it known that I, EDWARD W. BURGESS, a citizen of the United States, residing at Chicago, in the county of Cook and State of Illinois, have invented certain new and useful Improvements in Shock-Hoists, of which the following is a full, clear, and exact specification.

My invention relates to shock hoists designed to advance with a wagon and load receiving rack and receive upon its fork shocks of grain or cocks of hay and elevate and dump them into the rack with power derived from the rear wheels of the wagon, while the wagon is being advanced continuously, and controllable by the operator.

The object of my invention is to provide suitable shock gathering means adapted to be attached to a wagon or truck, and adapted to be actuated by power derived from the wheels of such a wagon, whereby the shocks may be lifted and deposited in the wagon.

These objects are attained by means of the mechanism illustrated in the accompanying drawings, in which—

Figure 1 is a top plan view of a wagon and rack having a shock hoist connected therewith and embodying my invention;

Fig. 2 is a side elevation of Fig. 1;

Fig. 3 is a front end elevation of part of Fig. 1;

Fig. 4 is a detached part of Fig. 3, showing the lifting fork folded against the side of the rack;

Fig. 5 is a cross section of Fig. 2 in rear of the rear wheels of the wagon and showing the construction of the rack bed and the power transmission mechanism for lifting the fork.

Fig. 6 is an enlarged front elevation of the carriage for the hoisting fork, and Fig. 7 is an enlarged elevation of this carriage taken at right angles to Fig. 6.

The same reference characters designate like parts throughout the several views.

A wagon includes front and rear axles 6 and 7, respectively, having wheels 8 and 9, respectively, mounted thereon, 10 a front bolster member and 11 a rear bolster member, 12 longitudinally disposed rack bed frame members, 13 transversely disposed frame members secured to the upper sides of the members 12, 14 longitudinally disposed carrier guides secured to the members 13, 15 longitudinally disposed frame members secured to the carrier guides, 16 transversely disposed floor boards secured to the frame members 15, 17 longitudinally disposed carrier guides secured to the floor, 18 upwardly and forwardly inclined side frame members at the front of the rack bed and upon opposite sides thereof, having their lower ends secured to the frame members 15 and their upper ends to the front ends of upper longitudinally disposed side rails 19, 20 upwardly and rearwardly inclined frame members at the rear end of the rack bed and upon opposite sides thereof, having their lower ends secured to the rear ends of the frame members 15, and their upper ends to the rear ends of the side rails 19, 21 upwardly converging side frame members having their lower ends secured to opposite ends of the frame members 15 adjacent the members 18 and 20 and their upper ends to the middle part of the side rails 19 upon opposite sides of the rack.

The side walls of the rack comprise spaced slat members 22 secured to the inner sides of the frame members 18, 20 and 21. The front end wall includes transversely disposed spaced bars 23 secured to the frame members 18 and vertically disposed slats 24 spaced apart and secured to the bars 23, and 25 represents an operator's seat carried by the front of the rack. The rear end wall of the rack is pivoted at its upper end to the rear ends of the upper side rails 19 and releasable hooks 26 are provided for securing the end wall in a load receiving position.

The hoist includes vertically disposed channel members 27 spaced apart in the direction of the length of the rack and extending above its upper side rails and below its bed. The channels are secured to the side frame members of the rack, and are connected at their lower ends by means of a runner member 28, that is connected with the rack bed by means of upwardly and inwardly diverging brace members 29.

30 represents a carriage adapted to travel upon the channel members 27 and including vertically disposed side members 31 having their upper and lower ends connected by means of transverse bars 32 and 33, respectively, and 34 a diagonally disposed brace member, 35 outwardly extending horizontally disposed bars having their inner ends secured to the lower ends of the side members 31 and their opposite ends with the upper ends of the members 31 by means of truss members 36, and 37 represents a diagonally disposed brace member reinforcing the bars 35. 38 represents studs carried by the upper and lower ends of the side members 31, upon which are journaled wheels 39 adapted to travel in the channels 27, and 40 represents like studs carried by the transverse bars 32 and 33, upon which are journaled wheels 41 adapted to travel upon the inner edges of the inner walls of the channels 27; the wheel carried by the upper bar 32 traveling upon the front channel and that carried by the bar 33 traveling upon the rear channel. 42 represents a hinge member secured to a fork head 43 and provided with upstanding ear members 44 that are connected with the ends of the bars 35 by means of a hinge pin 45, and 46 are reinforcing strap members having their inner ends receiving opposite ends of the hinge pin 45 and their opposite ends secured to the fork head by means of a bolt 47.

48 represents a series of forwardly extending tines spaced apart and having their rear ends secured to the fork head 43, 49 a vertically disposed bar having its lower end pivotally connected with the outer end of the fork head by means including a hinge pin 50 and carrying a series of forwardly extending spaced guard fingers 51, 52 a vertically disposed bar connected with the bar 49 by means of hinge members 53 and carrying a series of spaced guard fingers 54 extending in the direction of the length of the fork head.

The power transmission mechanism includes a transversely disposed shaft 55, having its middle part journaled in bearing boxes 56 secured to the bed frame members 12 and its opposite ends journaled in bearing brackets 57 secured to opposite ends of one of the transverse frame members 13. Journaled upon the shaft adjacent the bearing boxes 56 are sprocket wheels 58 that are operatively connected, by means of chains 59, with driving sprockets 60 secured to the rear wheels of the wagon. The hubs of the sprocket wheels 58 are provided with clutch elements 61 that engage with corresponding clutch elements carried by sleeve members 62 splined upon the shaft and yieldingly pressed toward the sprockets by means of compression springs 63 reactive between pins 64 and the ends of the sleeves. Journaled upon one end of the shaft 55 adjacent a bracket member 57 is a hoisting drum 65 provided with clutch elements 66 upon the inner end of its hub 67 that are adapted to operatively engage with corresponding clutch elements 68 carried by a sleeve member 69 splined upon the shaft and provided with a peripheral channel 70 that receives the free ends of a clutch shipping fork 71 secured to the rear end of a rock shaft 72 journaled in the transverse frame members 13, and having at its front end an inwardly turned arm 73 within convenient reach of the foot of the operator from the seat 25, whereby the position of the clutch sleeve 69 upon the shaft 55 may be controlled. The clutch sleeve is normally held disengaged from the hub of the hoisting drum by means of the reactive force of a coiled torsional spring 74 encircling the rock shaft 72, having one end thereof connected with the shaft and its opposite end with the adjacent frame member 13 in a manner to rock the shaft in a direction to cause the clutch shipping fork 71 to move the sleeve 69 away from the hub of the hoisting drum. Integral with the hoisting drum is a friction rim 75 adapted for engagement with a brake shoe 76 carried by the free end of an arm 77 preferably integral with the clutch shipping fork 71 and normally preventing rotation of the hoisting drum when the clutch elements are disengaged. Journaled in a bracket member 78 secured to the upper end of the rear channel member 27 is a sheave 79, and 80 represents a hoisting cable passing over the sheave, having one end thereof connected with the hoisting drum and its opposite end with the carriage 30.

In operation the operator presses down upon the arm 73 sufficient to release the brake shoe 76 but not enough to cause engagement of the clutch members. The carriage 30 and fork will then descend until the fork tines ride upon the ground; the channel members 27 being inclined rearwardly at their lower ends to permit the points of the tines to operate close to the surface of the ground. The fork head 43 extends inward beyond the carriage 30 and is adapted to engage with the lower transverse bar 33 thereof in a manner to retain the fork in proper position when a load is being hoisted. As the wagon is moved forward the tines of the fork pass under the shock of grain; the operator then presses downward upon the arm 73, causing the clutch sleeve 69 to engage the hub of the hoisting drum, which then rotates with the shaft 55, thereby lifting the carriage 30 and the load carrying fork upward along the side of the rack until the inner end of the fork head 43 strikes a block 81 secured to the upper side rail of the rack between the channel members 27, and a continued upward movement of the carriage will cause the fork to tilt about the axis of the hinge pin 45 to a load dumping position, as shown by dotted lines in Fig. 3. When the fork has reached the position indicated the upper bar 32 of the carriage 30 engages the rear end of a lever 82 pivotally mounted upon the upper end of the front channel member 27 and having its opposite end pivotally connected, by means of a vertically disposed rod 83, with an arm 84 secured to the rock shaft 72, thereby rocking the shaft in a direction to disengage the clutch elements 67 and 68 and permit the brake shoe to engage with the friction rim 75 in a manner to retain the carriage and fork in an elevated position until another shock of grain has been reached and the operation is then repeated until the rack has received a load. The bars 49 and 52 carrying the guard fingers 51 and 54 are retained in operative position by means of a hook member 85 pivotally mounted upon the upper end of the bar 52 and engaging with a stud 86 carried by the bar 49. When the hook is released the bar 52 may be turned about its hinge connection with the bar 49, thereby carrying the guard fingers 54 to a position parallel with the fingers 51, and then the two bars may be turned inward and downward and folded upon the fork head, and then the head is turned upward against the side of the rack and secured in folded position by means of a releasable hook 87.

88 represents a transversely disposed shaft journaled in bearings 89 secured to the upper side rails 19 of the rack near their rear ends, and 90 is a like shaft journaled near the front ends of the rails. Secured to the opposite ends of the shafts are sprocket wheels 91 that receive endless carrier chains 92, and 93 represents a transversely disposed load leveling bar having its opposite ends connected with the endless carriers and adapted to be drawn by the endless carriers from end to end of the rack in a manner to level the top of the load when it reaches a height above the upper side rails of the rack. Motion is transmitted to the endless carriers connected with the leveling bar by means including a sprocket wheel 94 secured to the end of the shaft 88 outside of the upper side rail of the rack and operatively connected, by means of a sprocket chain 95, with a sprocket wheel 96 journaled upon the end of the shaft 55 adjacent the bracket 57 upon the opposite end of the shaft from that carrying the hoisting drum 65 and having its hub 97 provided with clutch elements 98 adapted to engage with corresponding clutch elements 99 upon one end of a clutch sleeve 100 splined upon the shaft and provided with a peripheral channel 101 that receives the forked end of a clutch shipping fork 102 secured to the rear end of a rock shaft 103 journaled in the transverse frame members 13 of the rack and provided at its front end with a laterally turned arm 104 convenient to the foot of an operator from the seat 25, whereby the position of the clutch sleeve 100 upon the shaft 55 is controllable. The clutch sleeve is normally held disengaged from the sprocket wheel by means of a coiled torsional spring 105 encircling the rock shaft 103, having one end thereof connected with the shaft and its opposite end with the adjacent rack frame member 13 and reactive in a manner to rock the shaft in a direction to disengage the clutch elements when the arm 104 is relieved of pressure. The rack is provided with endless unloading carriers 106 operative along its bottom. The shaft 55 is rotated constantly by means of its operative connections with the rear wheels of the wagon and the clutch elements 61 and 62 operate as a differential gear connection between the wagon wheels and the shaft and permit a backward movement of the wagon without imparting motion to the shaft.

Having shown and described one form that my invention may assume in practice, I do not desire that it be limited by the specific details of the structure as illustrated, it being understood that changes may be made in the form, proportion and organization of its several parts without departing from the spirit of my invention as indicated by the scope of the appended claims.

What I claim as my invention, and desire to secure by Letters Patent, is:

1. In combination, a shock hoist including a shock receiving and hoisting fork including a foldable member having guard fingers secured thereto, a wagon and load receiving rack, vertically disposed fork guiding members carried by said rack, fork hoisting mechanism, said fork being foldably connected to said rack.

2. In combination, a shock hoist including a shock receiving and hoisting fork, a fork head, a series of forwardly extending tines secured to said head, vertically disposed bars pivotally connected with said head, a series of guard fingers carried by each of said bars, and said bars being foldable upon said head.

3. In combination, a wagon and load receiving rack, a shock hoist including a fork head, forwardly extending tines secured to said head, vertically disposed guides carried by said rack, a carriage movably mounted upon said guides, means for hoisting said carriage, said fork head being hingedly connected with said carriage in a manner permitting it to be folded against the side of said rack and vertically disposed guard fingers foldably carried by said fork head.

4. In combination, a wagon and load receiving rack, a shock hoist including vertically disposed channel members carried by said rack, a carriage movably mounted upon said channel members, means for hoisting said carriage, and a shock receiving and carrying fork hingedly connected with said carriage in a manner permitting it to be turned upward along the side of said rack, said fork having foldably secured thereto a rear wall for retaining the shock on the fork.

5. In combination, a wagon and load receiving rack, a shock hoist including vertically disposed channel members inclined rearwardly at their lower ends spaced apart in the direction of the length of said rack and secured to one side thereof, a carriage movably mounted upon said channel members, a shock receiving and carrying fork hingedly connected with said carriage, and means for hoisting said carriage.

6. In combination, a wagon and load receiving rack, a shock hoist including vertically disposed channel members spaced apart in the direction of the length of said rack and secured to one side thereof, said channel members being inclined rearwardly at their lower ends and connected by means of a runner member, a carriage movably mounted on said channel members, a shock receiving and carrying fork hingedly connected with said carriage, and means for hoisting said carriage.

7. In combination, a wagon and load receiving rack, vertically disposed guides carried by said rack, a carriage movably mounted upon said guides, a shock receiving and hoisting fork connected with said carriage, means for hoisting said carriage, said means including a transversely disposed shaft journaled upon the bed of said rack and operatively connected with the rear wheels of said wagon, a hoisting element journaled upon said shaft, a flexible connection between said hoisting element and said carriage, manually controllable clutch mechanism operatively connecting said hoisting element with said shaft, clutch shipping mechanism including a longitudinally disposed rock shaft journaled upon the bed of said rack, a clutch shipping fork secured to the rear end of said shaft, an operating arm carried by the opposite end of said shaft, and a spring connected with said shaft and operative to normally hold said clutch mechanism disengaged.

8. In combination, a wagon and load receiving rack, vertically disposed guides carried by said rack, a carriage movably mounted upon said guides, a shock receiving and hoisting fork connected with said carriage, means for hoisting said carriage, said means including a transversely disposed shaft journaled upon the bed of said rack and operatively connected with the rear wheels of said wagon, a hoisting drum journaled upon said shaft, a cable connection between said hoisting drum and said carriage, clutch mechanism connecting said drum with said shaft, manually controllable clutch shipping mechanism including a longitudinally disposed rock shaft journaled upon the bed of said rack, an arm secured to said rock shaft, a lever pivotally mounted on said rack and having one arm thereof located in the path of travel of said carriage and engaging said carriage when it has reached a predetermined height, and a rod connecting the remaining arm of said lever with the arm secured to said rock shaft.

In testimony whereof I affix my signature.

EDWARD W. BURGESS.

Copies of this patent may be obtained for five cents each, by addressing the "Commissioner of Patents, Washington, D. C."